(12) United States Patent
Ivankovich et al.

(10) Patent No.: US 8,204,788 B1
(45) Date of Patent: *Jun. 19, 2012

(54) ONLINE CAR BUYING

(75) Inventors: Andrew Joseph Ivankovich, San Antonio, TX (US); Steven Dale Zettner, San Antonio, TX (US); Miguel Antonio Arguello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/935,400

(22) Filed: Nov. 5, 2007

(51) Int. Cl.
*G06Q 40/00* (2012.01)
(52) U.S. Cl. ..................................... 705/26.1
(58) Field of Classification Search ............... 705/26, 705/27
See application file for complete search history.

(56) References Cited

U.S. PATENT DOCUMENTS

| | | | |
|---|---|---|---|
| 6,021,400 A * | 2/2000 | Gallacher et al. | 705/43 |
| 7,542,922 B2 * | 6/2009 | Bennett et al. | 705/26 |
| 7,610,216 B1 | 10/2009 | May et al. | |
| 2001/0039516 A1 | 11/2001 | Bennett et al. | |
| 2002/0002538 A1 * | 1/2002 | Ling | 705/41 |
| 2003/0182204 A1 * | 9/2003 | Rhee | 705/26 |
| 2004/0078320 A1 | 4/2004 | DeFrancesco et al. | |
| 2004/0111370 A1 * | 6/2004 | Saylors et al. | 705/40 |
| 2005/0102188 A1 * | 5/2005 | Hutchison et al. | 705/26 |

OTHER PUBLICATIONS

Jones, R. "Online Auto Loans—Best Option Automobile Loans." Flixya, Oct. 18, 2007, [retrieved on the Internet on Feb. 4, 2008 using <URL: http://www.flixya.com/post/biosman2/36792/Online_ Auto_Loans_-_Best_Option_Automo...>].

Geffner, M. "Competition Heats up E-Mortgages." Realtor Magazine, Online Exclusive, Jun. 1, 1999, National Association of Realtors, [retrieved on the Internet on Feb. 4, 2008 using <URL: http://www.realtor.org/rmomag.nsf/pages/CompetitioMarArchive1999Jun>].

Press Release Newswire. "New Auto Loan Service Offers Fast Online Car Financing." PRWeb, Car Loan Genie, May 23, 2006, Torrance, California, [retrieved on the Internet on Feb. 4, 2008 using <URL: http://pdfserver.prweb.com/releases/2006/5/prweb387879.htm>].

Mullaney, T. "Don't Expect Miracles." Business Week, Apr. 16, 2001, The McGraw-Hill Companies Inc., [retrieved on the Internet on Feb. 4, 2008 using <URL: http://www.businessweek.com/print/magazine/content/01_16/b3728626.htm?chan=sb>].

U.S. Appl. No. 11/935,403, Non-Final Office Action mailed Apr. 1, 2010, 11 pgs.

(Continued)

*Primary Examiner* — Hani M Kazimi
(74) *Attorney, Agent, or Firm* — Schwegman, Lundberg & Woessner, P.A.

(57) ABSTRACT

Systems and methods are disclosed for purchasing an item that typically requires financing, such as an automobile, online. The methods and systems integrate various online purchasing aspects to provide consumers with a single, one-stop solution for completing an online purchase. In one implementation, the methods and systems provide an online buying application that allows a consumer to apply for a loan online and to have a lender fulfill the loan substantially in real time online. The online buying application then allows the user to research and select a product online, and to find and contact a participating dealer of the product online. The participating dealer may then interact with the lender directly online to complete the purchase of the product. The online buying application may also automatically process any documents connected to the purchase as well as apply any business rules to the purchase.

18 Claims, 11 Drawing Sheets

OTHER PUBLICATIONS

U.S. Appl. No. 11/935,403, Preliminary Amendment filed Nov. 6, 2007, 9 pgs.

U.S. Appl. No. 11/935,403, Response filed Aug. 2, 2010 to Non Final Office Action mailed Apr. 1, 2010, 10 pgs.

"U.S. Appl. No. 11/935,403 Final Office Action mailed Oct. 28, 2010", 10 Pgs.

"U.S. Appl. No. 11/935,403, Response filed Jan. 28, 2011 to Final Office Action mailed Oct. 28, 2010", 11 pgs.

* cited by examiner

FIG. 4A

Loan Application — 402

| Individual or joint account? | ● Individual   ○ Joint |
| --- | --- |
| Applicant name | John Doe |
| Address | 123 Main Street, Houston, TX 77002 |
| E-mail | john.doe@hotmail.com |
| Phone Number | 713-226-1292 |
| Purpose of loan? | Auto Purchase ▼ |
| Age of car? | ● 1-2 yrs  ○ 3-6 yrs  ○ ≥ 6 yrs |
| Dealer or individual purchase? | ● Dealer  ○ Individual    ○ Undecided |
| Amount requested? | $ 25,000 |

FIG. 4B

Loan Application — 404

|  | 48 Month Loan | 60 Month Loan | Custom Loan |
| --- | --- | --- | --- |
| Amount: | $25,000 | $25,000 | $37,000 |
| Rate: | 4.99% fixed | 5.49% fixed | ● Variable   ○ Fixed |
| Term: | 48 months | 60 months | 60 months |
| Payment: | $581.29 per month | $477.41 per month | $ |

[Select]   [Select]   [Calculate]

*Dealer Instructions*

Approval code:

Loan number:

Account number:

Routing number:

Amount of loan:

Receive payment: ___certified check ___ACH ___wire transfer

Dealer contact information:

*Submission instructions:*

*If an approval code is provided above, access our portal on www.carservice.com*

*For payment, fax a copy of this sheet, a copy of the signed purchase agreement, and signed title application to (XXX) XXX-XXXX or email to XXX@XXX.com.*

*Questions? Call (XXX) XXX-XXXX*

*FIG. 8*

ONLINE CAR BUYING

CROSS-REFERENCE TO RELATED APPLICATIONS

This present application is related in subject matter to, and incorporates herein by reference in its entirety, each of the following U.S. patent applications of Table I, each application entitled "Comprehensive Online Loan Transactions," and each filed Dec. 30, 2005:

TABLE I

Applications for Comprehensive Online Loan Transactions

| Ser. No. | Applicant Reference No. |
| --- | --- |
| 11/322,498 | US-0064.01 |
| 11/322,775 | US-0064.02 |
| 11/323,202 | US-0064.03 |

This present application is also related in subject matter to, and incorporates herein by reference in its entirety, each of the following U.S. patent applications of Table II, each application entitled "System and Method for Modular Electronic Signature Block," and each filed Aug. 1, 2006:

TABLE II

Applications for Modular Electronic Signature Block

| Ser. No. | Applicant Reference No. |
| --- | --- |
| 11/461,735 | US-0091.01 |
| 11/461,737 | US-0091.02 |
| 11/461,739 | US-0091.03 |

This present application is also related in subject matter to, and incorporates herein by reference in its entirety, each of the following U.S. patent applications of Table III, each application entitled "System and Method for Dynamic PIN," and each filed Aug. 1, 2006:

TABLE III

Applications for Dynamic PIN

| Ser. No. | Applicant Reference No. |
| --- | --- |
| 11/461,742 | US-0092.01 |
| 11/461,745 | US-0092.02 |
| 11/461,750 | US-0092.03 |

This present application is also related in subject matter to, and incorporates herein by reference in its entirety, each of the following U.S. patent applications of Table IV, each application entitled "Real-Time Prescreening for Credit Offers," and each filed Sep. 21, 2007:

TABLE IV

Applications for Real-Time Prescreening for Credit Offers

| Ser. No. | Applicant Reference No. |
| --- | --- |
| 11/859,235 | US-0301.01 |
| 11/859,150 | US-0301.02 |
| 11/859,160 | US-0301.03 |

This present application is also related in subject matter to, and incorporates herein by reference in its entirety, U.S. provisional patent application Ser. No. 60/914,983 entitled "Systems and Methods for a Streamlined Financed Purchase Process," filed Apr. 30, 2007.

This present application is also related in subject matter to, and incorporates herein by reference in its entirety, each of the following U.S. patent applications of Table V, each application entitled "Systems and Methods for Streamlined Purchasing," and each filed Oct. 12, 2007:

TABLE V

Applications for Streamlined Purchasing

| Ser. No. | Applicant Reference No. |
| --- | --- |
| 11/871,652 | US-0280.01 |
| 11/871,661 | US-0280.02 |

This present application is also related in subject matter to, and incorporates herein by reference in its entirety, a U.S. patent application Ser. No. 11/935,403 entitled "Online Car Buying," filed on the same date as this present application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to online transactions and, more particularly, to systems and methods for buying items online that typically require a monetary loan, such as a car.

BACKGROUND

Most consumers begin the process of buying an item that requires financing, such as an automobile, by contacting their lending institution (e.g., bank, credit union, etc.) to apply for a monetary loan. After checking the consumer's personal information and credit history, a representative of the lending institution informs the consumer of the loan amount, period, and interest rate for which he/she is eligible. If the consumer agrees to the terms of the loan, the lender representative delivers (e.g., by express mail, courier service, etc.) a "sight draft" to the consumer. The sight draft, when executed, grants to the lending institution a security interest in the purchased automobile as collateral for the monetary loan.

With the sight draft in hand, the consumer may proceed to an appropriate automobile dealership, select an automobile, and make the purchase. For the automobile dealership, the sight draft essentially serves as a check or cash payment from the lending institution. The dealership fills in the pertinent information on the sight draft, including the dealership's name, the automobile's vehicle identification number (VIN), and the purchase price, and the consumer signs the sight draft to complete the purchase. The dealership then sends the sight draft along with the purchase agreement and title application to the lending institution for processing and payment.

With the advent of the Internet and electronic commerce (e-commerce), many aspects of the above process may now be performed online. For example, certain lenders provide their customers the option to apply for a monetary loan online. (Fulfillment of the loan application is still largely a manual process, however, as most lenders require the customer to hand sign the loan documents and return them to the lenders.) Similarly, consumers may now research and select the automobiles they wish to purchase online through a commercially-available car pricing service, such as Zag.com, Inc. of Santa Monica, Calif. However, while these and other online options are significantly more convenient than their manual counterparts, they are generally still discrete and disconnected options; that is, each online option requires the consumer to complete that option separately and independently from other online as well as manual options.

Accordingly, what is needed is a more convenient way for consumers to purchase an item that typically requires financing, such as an automobile, online. More specifically, what is needed is a way to integrate various aspects of online buying in order to provide consumers with a single, one-stop solution for conducting online purchases.

SUMMARY

The disclosed embodiments relate generally to systems and methods for purchasing an item that typically requires financing, such as an automobile, online. The methods and systems integrate various online purchasing aspects to provide consumers with a single, one-stop solution for completing an online purchase. In one implementation, the methods and systems provide an online buying application that allows a consumer to apply for a loan online and to have a lender fulfill the loan substantially in real time online. The online buying application then allows the user to research and select a product online, and to find and contact a participating dealer of the product online. The participating dealer may then interact with the lender directly online to complete the purchase of the product. The online buying application may also automatically process any documents connected to the purchase as well as apply any business rules to the purchase.

BRIEF DESCRIPTION OF THE DRAWINGS

The foregoing and other advantages will become apparent from the following detailed description and upon reference to the drawings, wherein:

FIGS. 4A-4B illustrate an exemplary user interface for an online loan application according to the disclosed embodiments;

FIG. 8 illustrates an exemplary set of dealer instructions for online buying according to the disclosed embodiments;

DETAILED DESCRIPTION

Figure 1:
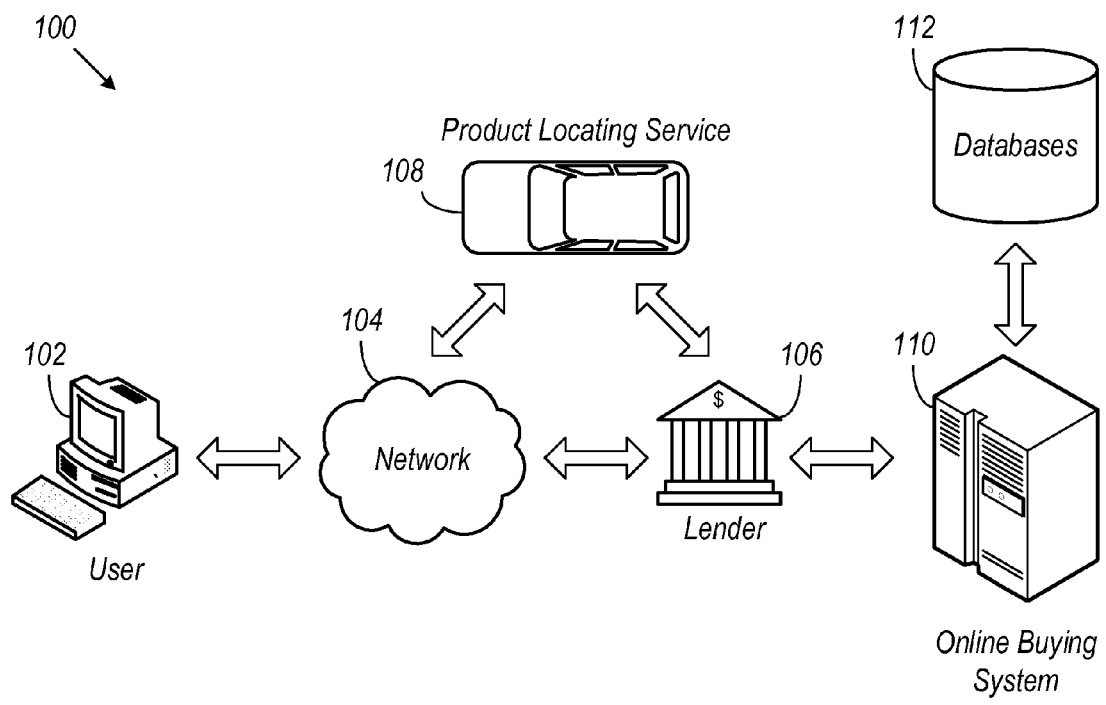
FIG. 1 illustrates an exemplary infrastructure for online buying according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, an exemplary infrastructure 100 is shown that is capable of being used to conduct online purchases of the type that normally require financing according to the disclosed embodiments. The exemplary infrastructure 100 allows a user 102 to connect to a network 104, such as the Internet, and subsequently to a lender 106 and to a product locating service 108 (e.g., Zag.com, etc.) for purposes of conducting an online purchase. By way of example, the online purchase is described herein with respect to an automobile purchase. Those having ordinary skill in the art will understand, however, that the disclosed embodiments are fully applicable to other types of online purchases, including boats, motorcycles, recreational vehicles (RV), and the like. In general, the disclosed embodiments are applicable to any type of online purchase where financing or a monetary loan is required.

In accordance with the disclosed embodiments, the lender 106 may include an online buying system 110 and one or more databases 112 for allowing the user 102 to conduct an online purchase. In one implementation, the online buying system 110 may be accessible by the user 102 through a Web site of the lender 106. The Web site may allow the user 102 to log on and apply for a loan online from a Web page of the lender 106, and to have the lender 106 fulfill the loan substantially in real time online. The online buying system 110 may then allow the user 102 to connect to a Web site of the product locating service 108 where he/she may research and price a desired product online. In some implementations, the lender 106 itself may also provide a product locating service (e.g., through the Web site of the lender 106) instead of, or in addition to, the product locating service 108. The user 102 may then find and contact one of several participating dealers of the product via the product locating service 108. The participating dealer may then interact with the lender 106 directly, for example, via a dealer portal of the lender 106, to complete the purchase of the product.

An advantage of the above arrangement is that the lender 106 may take advantage of the existing network of participating dealers of the product locating service 108. These dealers are typically dealers that the product locating service 108 has already verified as legitimate businesses and may therefore be trusted by the lender 106. This saves the lender 106 from having to conduct background due diligence on the dealers and also avoids requiring the dealers to "sign up" with yet another lender. The online buying system 110 may then automatically process any documents connected to the purchase, such as purchase agreements, title applications, final loan documents, and the like, as well as apply any business rules of the lender 106 to the purchase. These documents may then be electronically stored in the databases 112.

Figure 2:
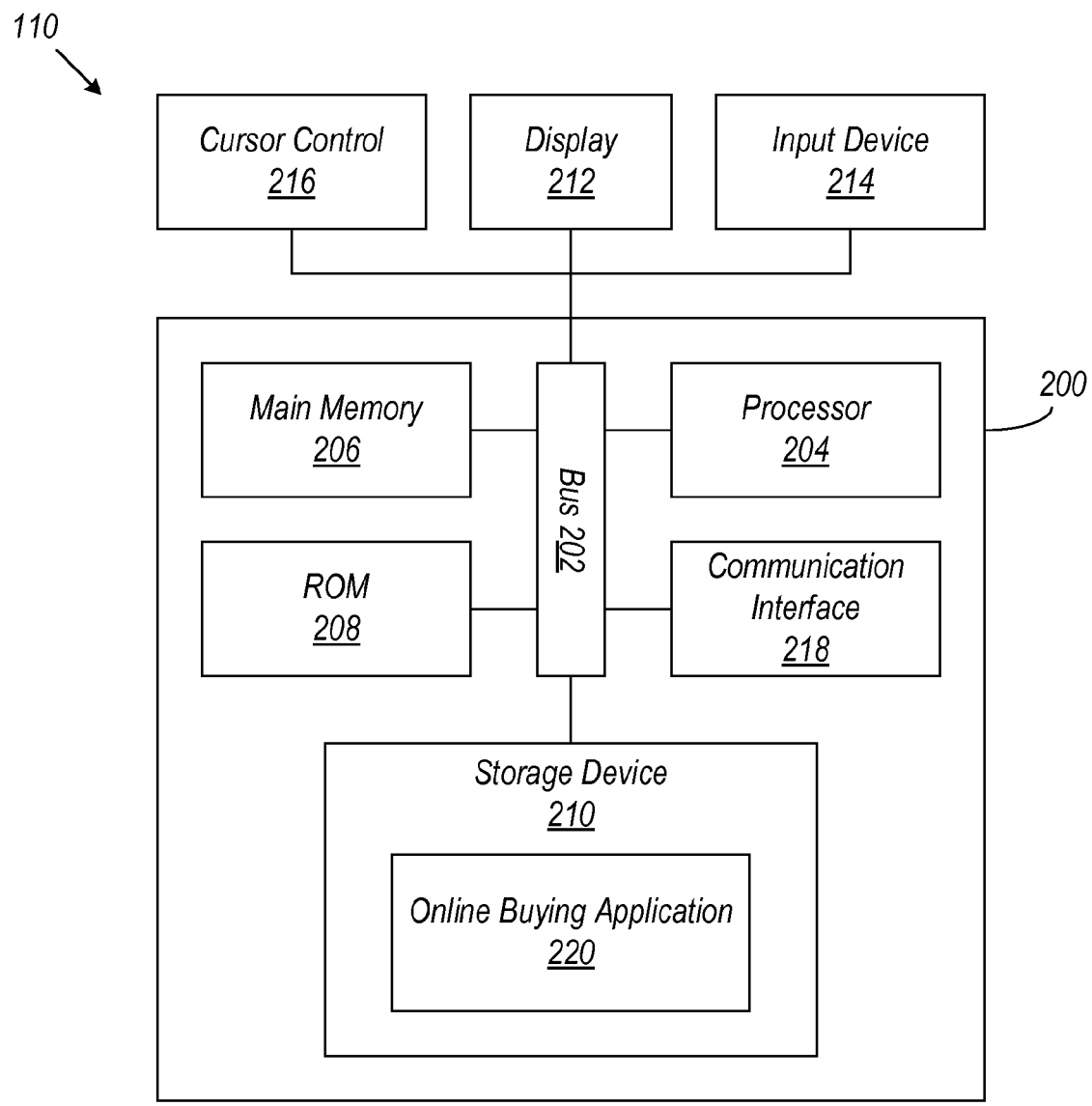
FIG. 2 illustrates an exemplary system for online buying according to the disclosed embodiments.

FIG. 2 illustrates an example of the online buying system 110 according to the disclosed embodiments. As can be seen, in some embodiments, the online buying system 110 may be composed of a typical computer system 200. Any suitable computer system 200 known to those having ordinary skill in the art may be used as the online buying system 110, including a personal computer, server, workstation, mainframe, and the like. Furthermore, although a single computer system is shown in FIG. 2, those having ordinary skill in the art will understand that the online buying system 110 may include multiple computer systems working in conjunction with one another.

The computer system 200 typically includes a bus 202 or other communication mechanism for communicating information and a processor 204 coupled with the bus 202 for processing information. The computer system 200 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computer system 200 may further include a read-only memory (ROM) 208 or other static storage device coupled to the bus 202 for storing static information and instructions for the processor 204. A computer-readable storage device 210, such as a magnetic, optical, or solid state device, may be coupled to the bus 202 for storing information and instructions for the processor 204.

The computer system 200 may be coupled via the bus 202 to a display 212, such as a cathode ray tube (CRT) or liquid crystal display (LCD), for displaying information to a customer. An input device 214, including, for example, alphanumeric and other keys, may be coupled to the bus 202 for communicating information and command selections to the processor 204. Another type of customer input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the computer system 200 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The computer system 200 may also include a communication interface 218 coupled to the bus 202. The communication interface 218 typically provides a two way data communication coupling between the computer system 200 and the network 110. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, an online buying application 220, or more precisely, the computer-readable instructions therefor, may reside on the storage device 210. The online buying application 220 may then be executed to allow the user 102 to conduct various online purchases of the type that require financing from the lender 106. In particular, the online buying application 220 allows the user to apply for a loan online and to have the lender 106 fulfill the loan substantially in real time online. The online buying application 220 then allows the user to research and select a product online, and to find and contact a participating dealer of the product online. The participating dealer may then interact with the lender 106 directly online to complete the purchase of the product. The online buying application 220 may also automatically process any documents connected to the purchase as well as apply any business rules of the lender 106 to the purchase.

Figure 3:
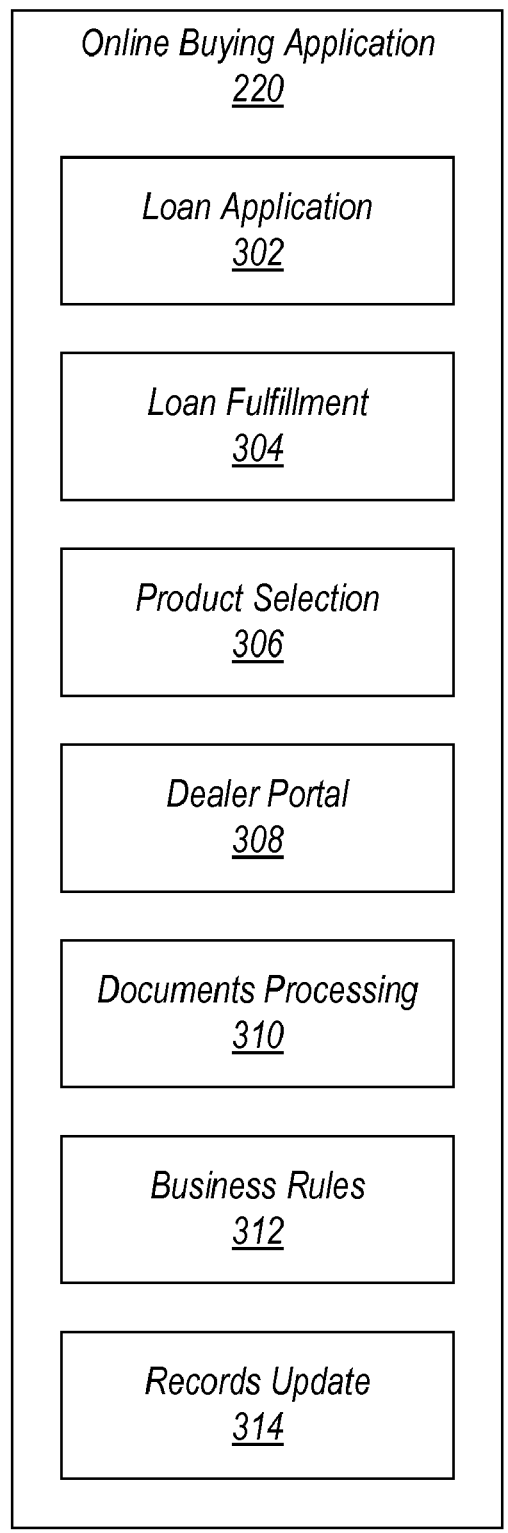
FIG. 3 illustrates an exemplary application for online buying according to the disclosed embodiments.
Figure 5:
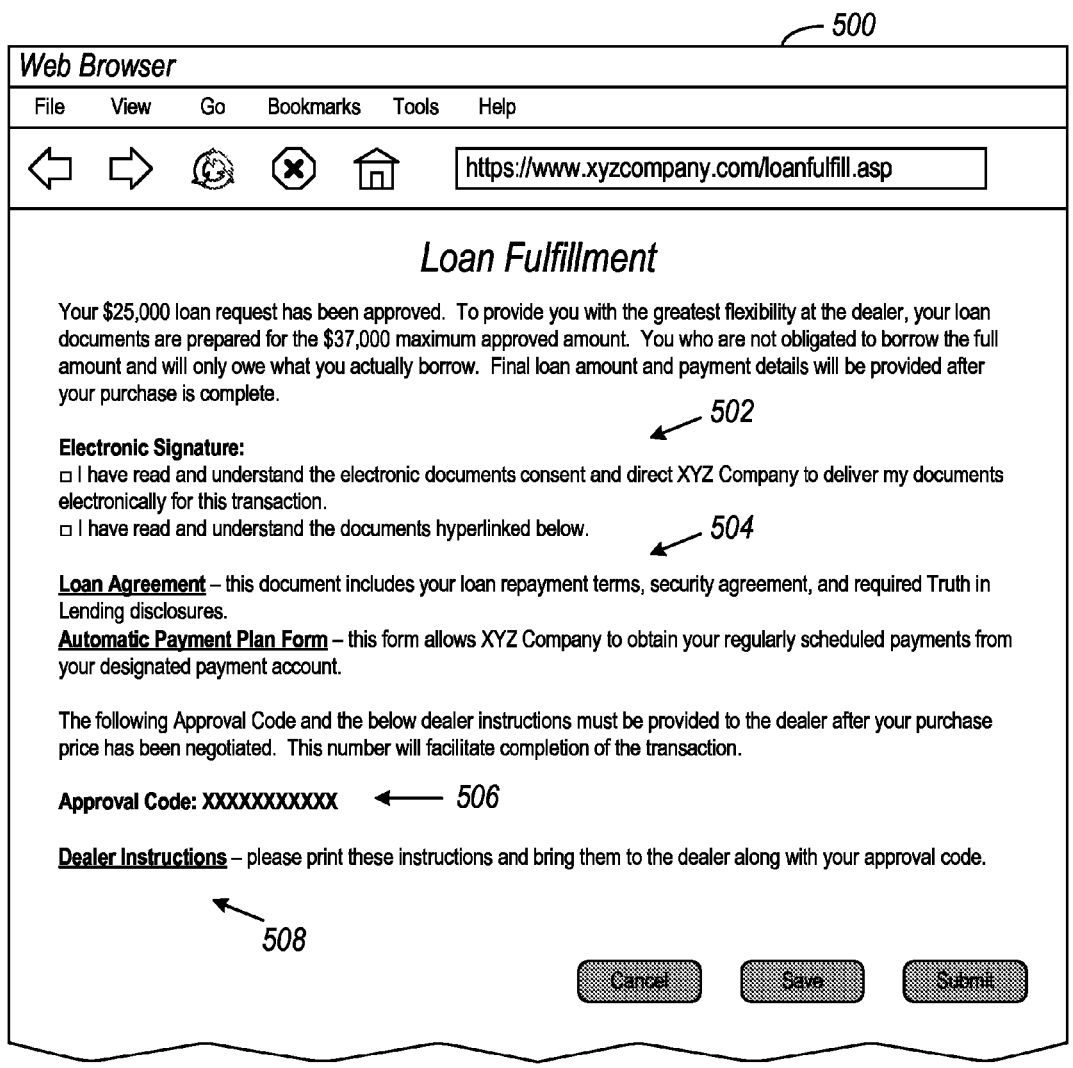
FIG. 5 illustrates an exemplary user interface for online loan fulfillment according to the disclosed embodiments.

Referring now to FIG. 3, in one embodiment, the online buying application 220 may comprise a number of functional components, including a loan application module 302, a loan fulfillment module 304, and a product selection module 306. In addition, the online buying application 220 may also include a dealer portal module 308, a document processing module 310, a business rules module 312, and a records update module 314. Other functional components may also be added to or removed from the online buying application 220 without departing from the scope of the disclosed embodiments. Note that although the various functional components 302-314 of the online buying application 220 have been shown as discrete units in FIG. 3, those having ordinary skill in the art will understand that two or more of these components may be combined into a single component, and that any individual component may be divided into several constituent components, without departing from the scope of the disclosed embodiments. Operation of the functional components 302-314 is now described with respect to FIGS. 4A-8 for an automobile purchase.

Referring to FIGS. 4A-4B, an exemplary loan application interface 400 provided by the loan application module 302 is shown for allowing the user 102 to apply for a loan online. Referring first to FIG. 4A, the loan application interface 400 shown here may be a Web-based interface that may be accessible, for example, by the user 102 logging on to a Web site of the lender 106 and going to the appropriate Web page. As can be seen, the loan application interface 400 may include a plurality of information fields 402 for the user 102 to fill in. Such information fields may include fields for the user's name, mailing address, e-mail address, phone number, purpose of the loan, loan amount, and the like. Of course, those having ordinary skill in the art will recognize that other types of information may be requested included without departing from the scope of the disclosed embodiments.

This information provided by the user 102 may then be processed by the lender 106 to generate one or more loan options for the user 102, summarized at 404 in FIG. 4B. As can be seen, the user 102 in this example has qualified for the requested loan amount (e.g., $25,000) under the stated rates and terms. In addition, the user 102 may also qualify for an additional, higher loan amount (e.g., $37,000) based on his/her good credit and has the option to select the higher loan instead. In some embodiments, the determination of whether the user 102 is qualified for a loan, the loan amount, interest rate, and other loan terms, may be calculated automatically and substantially in real time. This may be done, for example, using the concepts and principles disclosed in U.S. patent application Ser. Nos. 11/859,235, 11/859,150, and 11/859,160, entitled "Real-Time Prescreening for Credit Offers," which are incorporated herein by reference. Under such an arrangement, underwriter review of the loan information may not be required to determine the credit worthiness of the user 102 in most instances and the user 102 may have his/her loan application process much more quickly.

Selection of one of the loan offers may takes the user 102 to a loan fulfillment interface 500, as provided by the loan fulfillment module 304, where the user 102 may be notified that his/her loan has been approved. The user 102 may now complete the loan application by electronically signing at 502 by selecting the appropriate check boxes. By selecting these checkboxes, the user 102 is stating that he/she has clicked on the hyperlinks for the loan documents, indicated generally at 502, and has read and understood them. In some embodiments, the lender 106 may also require the user 102 to complete an automatic payment plan form that allows the lender 106 to automatically deduct the loan payments from a designated account. Clicking on the submit button automatically fulfills the loan and generates a loan approval code. This approval code, indicated at 506, may then be taken by the user 102 along with a set of dealer instructions 508 to a participating dealer. In some embodiments, a pre-approval page for the loan may also be provided to the user 102 to print out and take to the dealer.

Figure 6A:
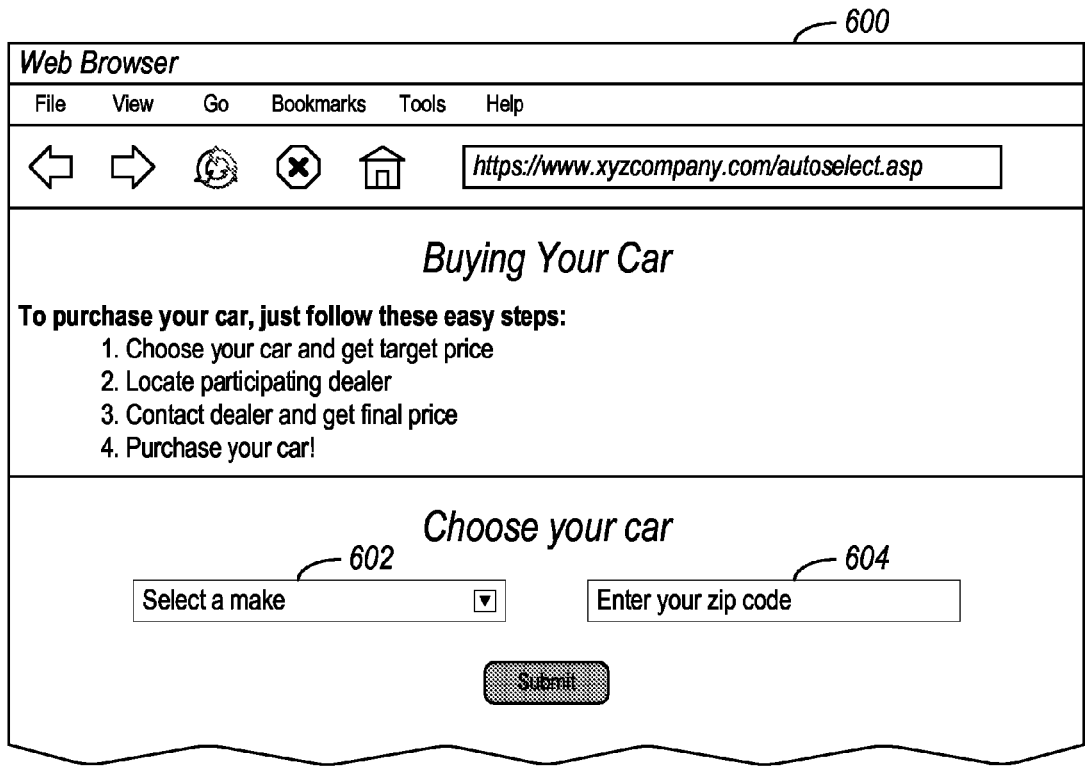
FIGS. 6A-6B illustrate an exemplary user interface for selecting a product and a dealer online according to the disclosed embodiments.
Figure 6B:
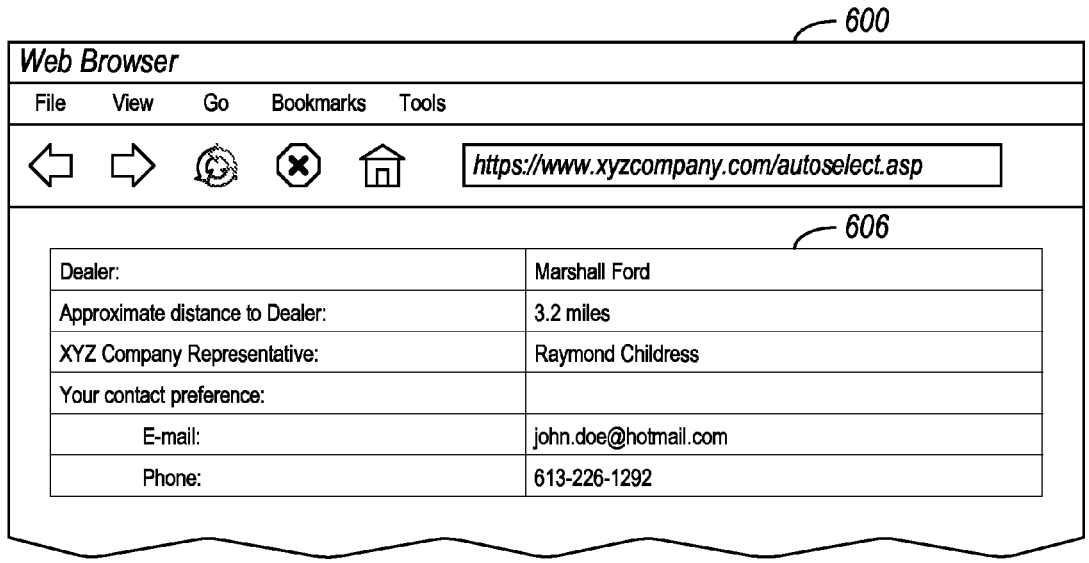

From the loan fulfillment interface 500, the user may be taken automatically to an automobile selection interface 600 that is provided by the product selection module 306, as shown in FIGS. 6A-6B. From here, the user 102 may select and price an automobile, and may also locate a participating dealer by entering an automobile make, indicated at 602, and a zip code of the user 102, indicated at 604. One or more participating dealers may then be displayed, indicated at 606, along with the contact information therefor. Online automobile selection, pricing, and dealer location services and other similar product location services 108 (e.g., Zag.com) are generally well known to those having ordinary skill in the art and therefore will not be described in detail here. In a typical arrangement, a lender 106 may contract with the product location service 108 to allow the customers of the lender 106 to go directly (e.g., via a tab in a Web browser, a hyperlink, etc.) to the Web site of the product location service 108. Once there, the customers may freely use the services of the product location service 108 based on his/her account or membership with the lender 106.

Figure 7:
FIG. 7 illustrates an exemplary dealer portal for allowing a dealer to interact with a lender online according to the disclosed embodiments.

Through the product location service 108, the user 102 may select an automobile, contact the dealer, and negotiate a final price (which may involve a discount based on his/her account or membership with the lender 106). The user 102 may then provide the dealer with the loan approval code 506 generated previously (see FIG. 5) by the lender 106 along with the dealer instructions sheet 508 and any other information specified by the lender 106 as being required by the dealer. In accordance with the disclosed embodiments, the dealer may then access a portal of the lender 106 using the approval code 506. Such a portal allows the dealer to log on and interact directly with the lender 106 as illustrated in FIG. 7. Such an arrangement allows the lender 106 to benefit from the network of dealers that the product locating service 108 has already verified as legitimate businesses and saves the dealers from having to "sign up" with yet another lender.

As can be seen in FIG. 7, a dealer portal interface 700, provided by the dealer portal module 308, may include a field 702 for allowing the dealer to enter the approval code. In some implementations, the dealer portal interface 700 may also require additional information, such as a PIN and/or account number of the user 102. Once the requested information is provided, the dealer portal interface 700 may retrieve and display the customer information for the loan associated with the approval code. The dealer may then fill in various loan information fields, indicated generally at 706, and well as automobile information fields, indicated generally 708. Examples of loan information may include the dealer account number, dealer routing number, loan amount, whether of the payment will be made by direct deposit, and the like. Examples of automobile information may include which party is completing the title work, the title state, whether the vehicle was previously titled, vehicle mileage, fuel type, and vehicle identification number (VIN).

In some embodiments, the dealer may then be instructed to complete the dealer instructions sheet 508 (see FIG. 5), an example of which is indicated at 800 in FIG. 8. As can be seen, the dealer instructions sheet 800 may require the participating dealer to fill in certain information, such as the approval code, a loan number (which may provided by the lender 106 via the dealer portal interface 700), dealer account number, dealer routing number, amount of the loan, how the dealer would like to receive the payment (e.g., certified check, ACH, wire transfer, etc.), and dealer contact information. The dealer may then send the instructions sheet 800 (e.g., faxed, e-mail, file upload, etc.) to the lender 106, along with the executed purchase agreement and signed title application, in order for the lender 106 to finalize the purchase and provide payment to the dealer.

In some embodiments, instead of the user 102 providing the dealer with the dealer instructions sheet 800, the dealer may obtain the dealer instructions sheet 800 directly via the dealer portal interface 700. This arrangement has an advantage in that some of the information, such as the loan number, required by the lender 106 to finalize the purchase and provide payment to the dealer may already be automatically prefilled by the lender 106 on the dealer instructions sheet 800. In addition, having the dealer obtain the dealer instructions sheet 800 from the dealer portal 700 relieves the user 102 from having to print and bring the dealer instructions sheet 800 with him/her to the dealership.

In some embodiments, the information required by the lender 106 to finalize the purchase and provide payment to the dealer may be provided entirely through the dealer portal 700 cents that only the executed purchase agreement and signed title application needs to be sent to the lender 106 (i.e., no dealer instructions sheet needed).

Once dealer instructions sheet 800, purchase agreement, and title application, are received by the lender 106, the document processing module 310 is responsible for automatically processing these documents. To this end, the document processing module 210 may provide an option for imaging the documents (if not already imaged) and reading them using commercially available optical character recognition (OCR) technology. The document processing module 310 may then provide an option for verifying the information, importing and storing the information into the backend systems of the lender 106 normally responsible for storing such information.

Business rules may then be automatically applied to the purchase by the business rules module 312 based on information provided. These business rules are designed by the lender 106 to detect potential problems with the purchase. For example, the business rules module may be designed detect whether the loan-to-value ratio is appropriate for the particular user 102 and/or the particular automobile he/she wishes to purchase. The business rules may also be designed to detect a potentially fraudulent transaction, for example, if the user 102 and/or the dealer has a "fraud" indication or the like on his/her record. Other business rules may also be derived by those having ordinary skill in the art without departing from the scope of the disclosed embodiments.

Finally, the records update module 314 is responsible for automatically updating the lender's database 112 with the final terms of the loan. Thus, for example, the records update module 314 may update the database 112 with the final loan amount, interest rate, monthly payment amount, duration of the loan, and the like, based on the final purchase price of the automobile. The final loan documents may then be automatically sent to the user 102 and payment automatically sent to the dealer.

Figure 9:
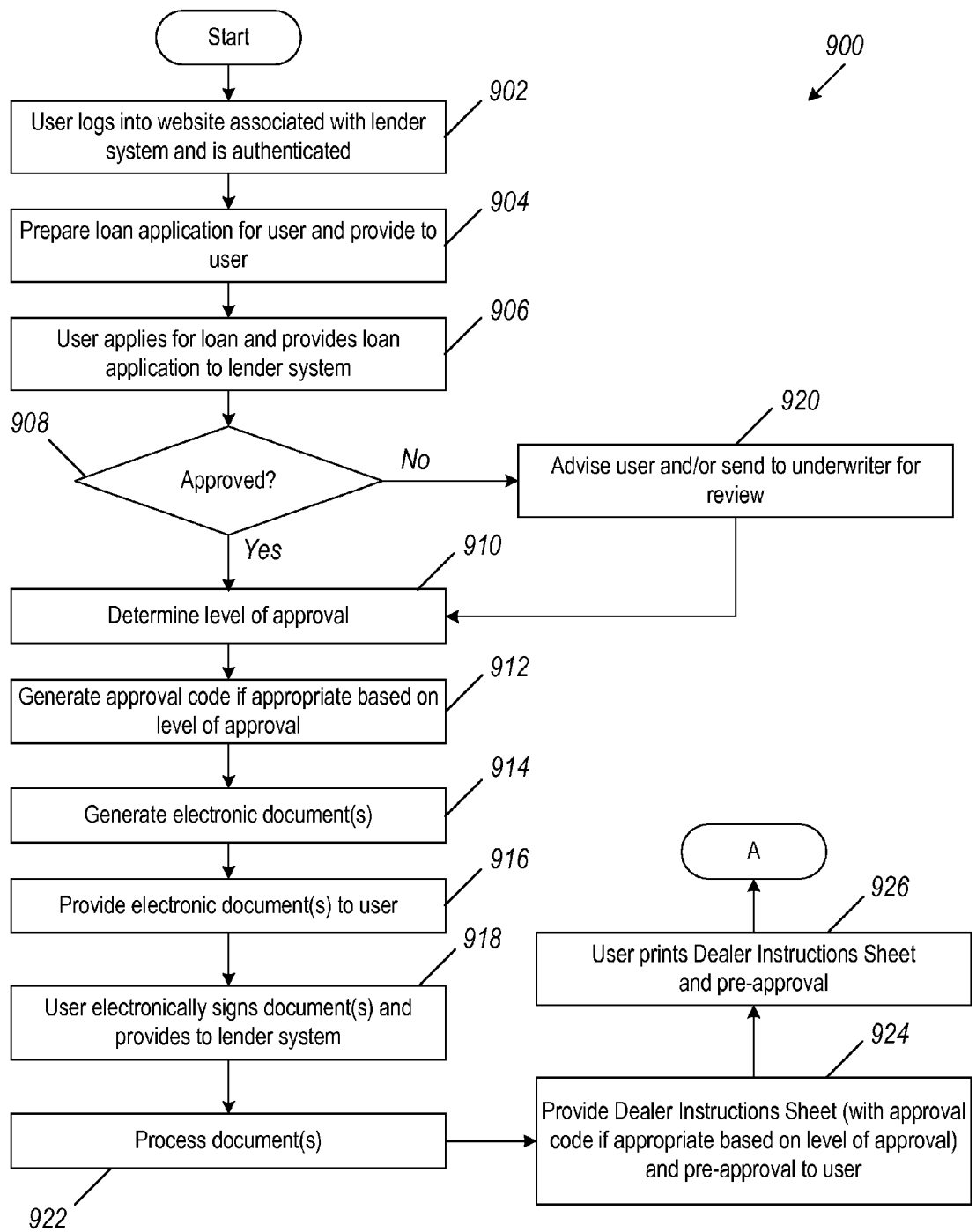
FIG. 9 illustrates an exemplary method for online buying according to the disclosed embodiments.

Thus far, specific embodiments have been disclosed for online buying according to the disclosed embodiments. Referring now to FIG. 9, general guidelines are shown in the form of a method that may be used to implement the various embodiments disclosed above. As can be seen in FIG. 9, an exemplary method 900 for online car buying begins at block 902, where a user may log into a lender system, such as a Web site, via a user computing device with a Web browser and may be authenticated. Any known technique of authentication may be used, such as user name, password, personal identification number (PIN), thumbprint, key, or other identifier or credential, or a combination thereof, for example.

Once the user has completed the initial communication with the lender system, an online buying application may access the user information stored in a database as well as the forms and other information to prepare a loan application for the user and provide the loan application to the user, at block 904.

Such loan application generation may involve inserting user information into a pre-existing form, the generation "from scratch" of a form based on both form and user information, or some combination thereof. It will be appreciated that portions of the form may not be filled in with user information if such user information is not available for the particular area of the form.

At block 906, the user may apply for a loan via a loan application provided via the Web site. In one implementation, the loan may be an automobile loan for purchase of an automobile from a dealer, though this is an example, and the loan may be any type of loan as further described previously.

At block 908, it may be determined automatically and in real time whether the loan application may be approved. If the loan application is approved, then a level of approval may be determined at block 910. The level of approval may provide an indication as to whether or not the instructions sheet that will be generated will have an approval code that will allow a dealer to access the dealer portal to provide information to the lender system, described above. In some embodiments, the level of approval may be numerical or textual, for example, and may be based on one or more factors, such as desired amount of loan, user's credit history, user's credit rating, whether the loan application had to be reviewed by an underwriter, and the like.

At block 912, the level of approval is compared to a predetermined threshold or level, such as a numerical threshold or textual level, and if the level approval meets the threshold or level, then an approval code may be generated. The approval code may be unique for every transaction, and may be randomly generated and/or based on information pertaining to the loan application or the user, for example, such as the application number or the user's customer number. Any technique for generating a unique code may be used.

In one implementation, an approval code may be generated for every loan application that has been approved. In such case, block 910 may be skipped, and an approval code may be generated at block 912 upon the approval determination at block 908.

The lender system may set information, such as the loan type and amount (e.g., an "up to" dollar amount), the interest rate, the duration of the loan, payment details, titling information and other pertinent information for example, and may generate one or more electronic documents, such as a loan contract, at block 914.

At block 916, the user may be electronically provided with the electronic document(s) pertaining to the loan. In one implementation, the document(s) may be provided electronically, such as via hyperlinks on the Web site, but may also be provided through e-mail, for example. A Web-based note (e.g., a promise to pay a specified amount of money on demand at a certain time), disclosure, and security agreement may be generated by the lender system for securing the loan. This information may be displayed to the user. The note, disclosure, and security agreement may specify the terms of the loan and, when executed, may grant to the lender a security interest in the product or service to be purchased.

The user may electronically sign the document(s) at block 918. As described previously, the documents may include a security agreement and a note, for example.

In one implementation, if the loan application is not approved at block 908, the user may be so advised and/or the application may be sent to an underwriter for review at block 920. If the underwriter approves the loan application, processing may continue at block 922; otherwise, the process may end.

At block 922, the signed documents may be reviewed and if they are in order, then the lender system may provide dealer instructions along with an approval code if appropriate, and a pre-approval for the loan to the user, at block 924. The user may print the dealer instructions, approval code, and pre-approval taking to a dealer, at block 926. At this point, in one implementation, the user no longer has to interact with the lender system to finalize the loan, and the method 900 continues with the dealer, as shown in FIG. 10.

Figure 10:
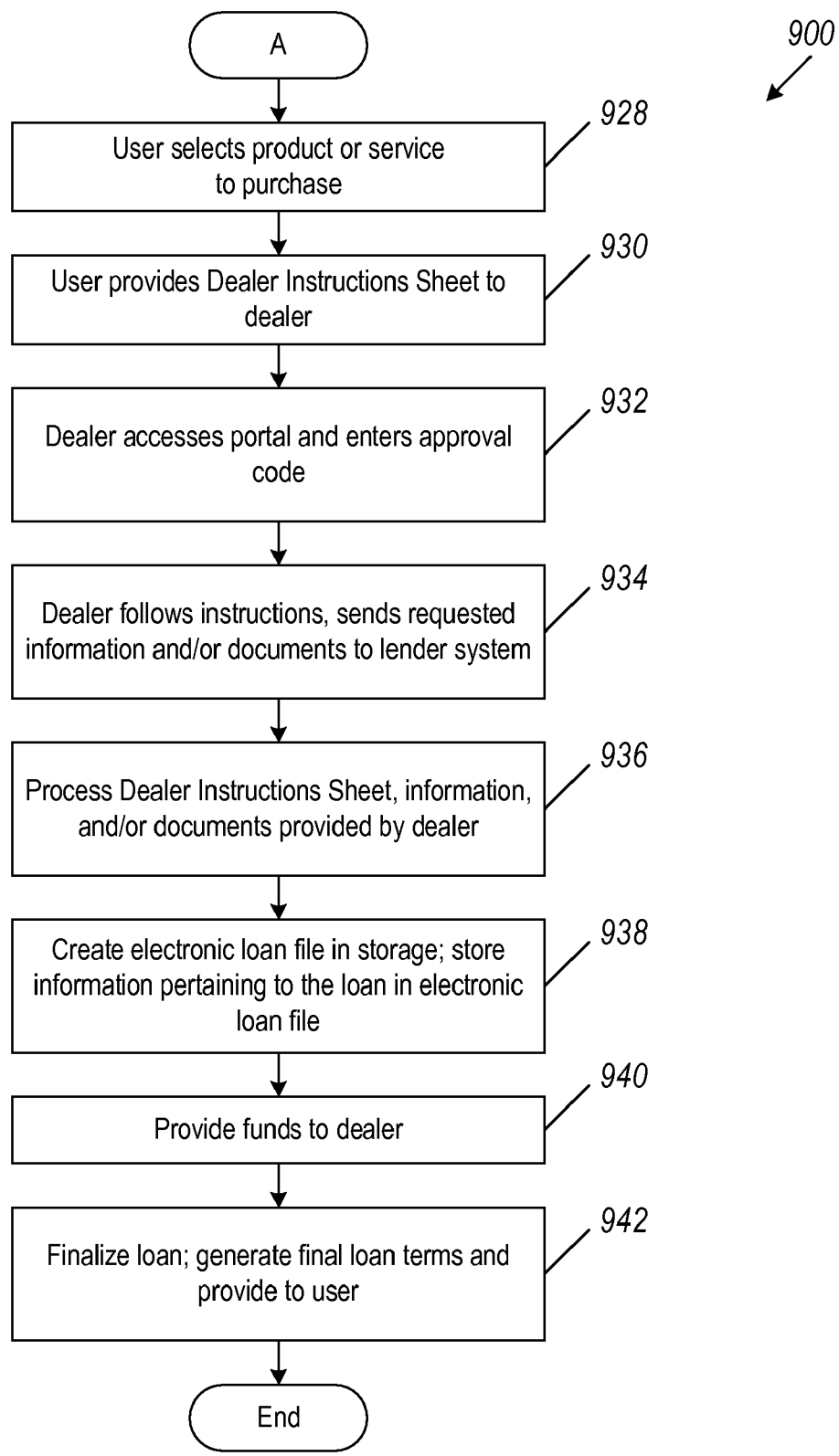
FIG. 10 illustrates a continuation of the exemplary method for online buying of FIG. 9 according to the disclosed embodiments.

FIG. 10 is a continuation of the method 900 that may be used to conduct a purchase involving a monetary loan. At some point, after receiving the dealer instructions, the user may select a product or service, such as an automobile, via a Web site of the product locating service, that the user would like to purchase, at block 928. The user may then go to a participating dealer and may sign a purchase agreement, title papers, and the like, if appropriate.

The user may provide the dealer instructions sheet to the dealer at block 930 at this time. At block 932, if an approval code has been provided with the instructions sheet, the dealer may access the dealer portal of the lender via the Web site of the product locating service. The dealer may then provide the approval code and any other information requested for identification and authentication, such as a user PIN or account number, to the dealer portal.

If the approval code is still valid (e.g., has not expired) and is authenticated, the dealer may provide information requested on the instructions sheet to the lender system via the portal at block 934. The dealer may also gather any documents and information requested by the lender at this time.

As noted above, the dealer may provide information such as the amount the user wants to borrow, along with product identifiers, such as a VIN, mileage, and fuel type, for example. The lender system may use this information from the dealer to determine additional information regarding the product and/or the dealer (e.g., additional details about the vehicle and/or the dealer may be retrieved from storage and/or a third party such as Zag.com) along with information based on the product, such as a loan-to-value ratio. The lender system may confirm that value of the product (i.e., the collateral) is high enough relative to the loan amount that may be provided to the user. If additional information is needed by the lender system, the dealer or the user may be contacted and requested to provide the additional information.

In one implementation, the dealer may send the filled out dealer instructions sheet, along with any other requested information and/or documents such as a title application and/or an executed copy of a purchase agreement, to the lender system, e.g., by the portal, a Web site, email, facsimile, or any other known transmission technique, at block 934. If an approval code is not provided to the dealer, block 932 may be bypassed, and the dealer may provide information requested on the instructions sheet to the lender system at block 934 in a manner other than via the portal.

Figure 11:
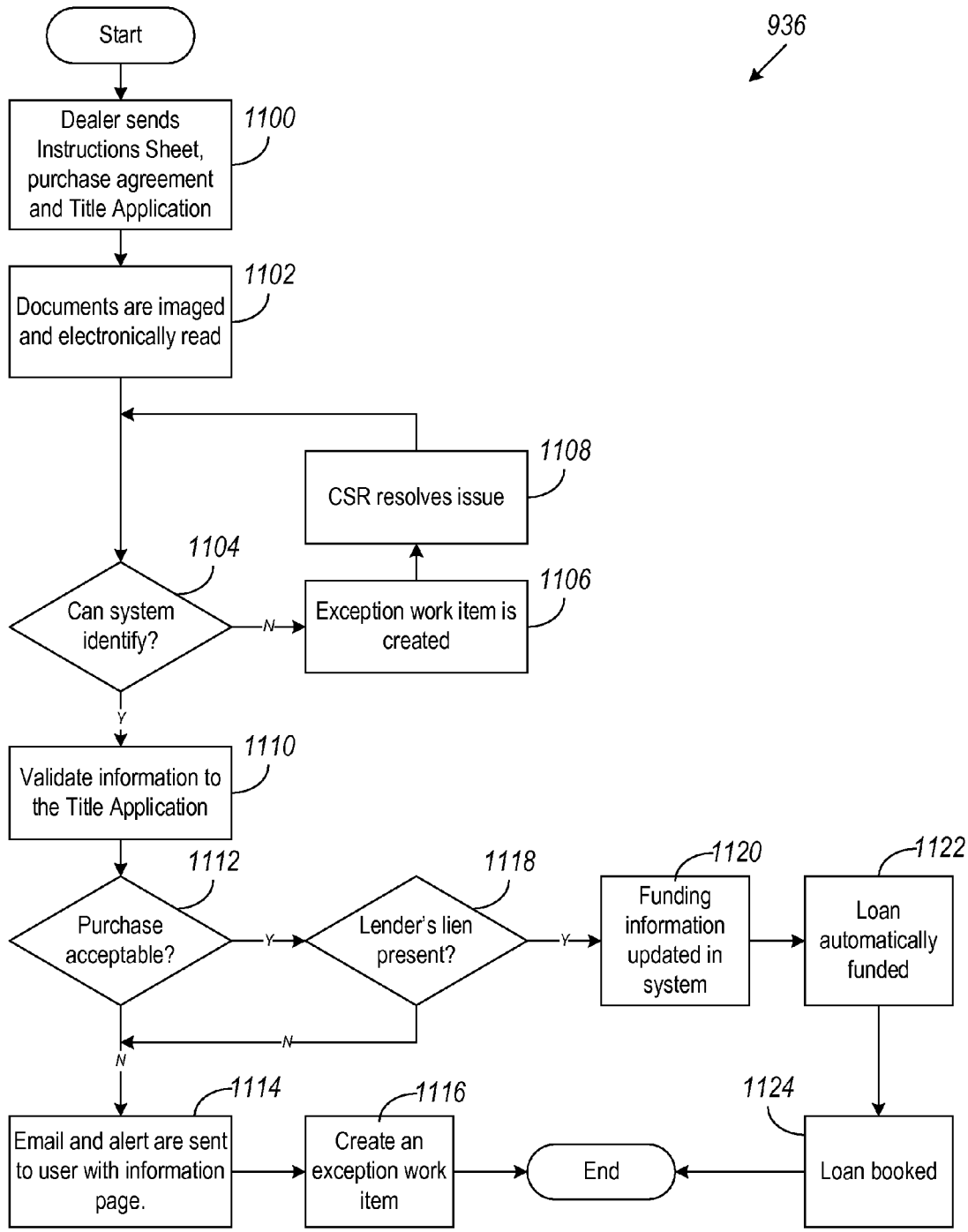
FIG. 11 illustrates an exemplary method of processing an online purchase according to the disclosed embodiments.

At block 936, the lender system automatically processes the information on the dealer instructions sheet and other documents provided by the dealer, as described with respect to FIG. 11.

At block 938, the lender system may automatically enter information from the various documents into the lender's database. In one implementation, an electronic loan file may be created in the database in which information pertaining to the loan application may be stored. In one implementation, the information may include product (e.g., vehicle) information, loan amount, contract date, other loan details, and the like.

Thus, in one implementation, a tool such as a Web portal via the Internet may be provided to the dealer who may access the portal after providing a valid approval code. The dealer may provide information to the lender system via the Web portal in response to the dealer instructions. The information may then be automatically stored in an electronic loan file or other storage structure, thereby eliminating or substantially reducing manual entry of the information into the database.

If the documents provided by the dealer are in order, confirmation may be provided to the dealer by the lender system, and the lender system may provide funds to the dealer by directing a funding source to pay the dealer the loan amount at block 940. The funding may be provided by check, automated clearing house (ACH), wire transfer, or other known methods of monetary disbursement. If the dealer chooses ACH as the funding method, a title review process may be performed. If the documents provided by the dealer are not in order, the lender system may contact the dealer for corrected information and/or clarification. It is contemplated that the dealer may select a desired funding method using the portal, if the dealer is provided access to the portal.

The dealer may release the product or service to the user at this time, or any other time the dealer chooses. At block 942, the loan may be finalized and final loan terms may be generated and provided to the user, either electronically or via mail, for example. In one implementation, after the transaction is funded, the lender system may send a notice to the user via email or mail, detailing the collateral information, final financing terms (amount, rate, term, etc.), and monthly payment information, for example. It will be appreciated that the term "mail" may represent any type of non-electronic data transfer and should not be limited to postal mail.

Thus, the user applies for the loan and signs documents electronically, and there is no paper check generated or provided to the user for the loan. Additionally, after receiving the dealer instructions and pre-approval from the lender system, the user does not have to further interact with the lender system to finalize the loan. Moreover, processing of the information on the various documents provided by the dealer may be performed automatically by the lender system, as described below.

Referring now to FIG. 11, a more detailed explanation of block 936 of FIG. 10 is provided for automatic processing of the information on the various documents provided by the dealer. As can be seen, at block 1100, the dealer may send (e.g., fax, e-mail, file upload, etc.) the dealer instructions sheet, purchase agreement, and title application to the lender. At block 1102, the documents are imaged and electronically read by the lender system. A determination is made at block 1104 as to whether the lender system can recognize enough of the documents to process them. If not, then any work exception item is created at block 1106 and manual resolution by a customer service representative may be required at block 1108.

If the documents can be processed by the lender system, then at block 1110, the information contained on the documents, particularly the title application, may be automatically confirmed and validated. At block 1112, a determination may be made as to whether the purchase is acceptable, or whether there are potential issues with the purchase, based on one or more business rules of the lender. If there are any issues based on the business rules, then an alert may be sent to the user at block 1114 informing him/her of the issues. An exception work item may be created at block 1116 to be manually resolved by a customer service representative, and the transaction is ended.

If there are no issues with the purchase, then at block 1118, a determination is made as to whether a lender's lien is present on the automobile. If not, then the method returns to block 1114, where the user may be notified and an exception work item may be created for manual resolution. If yes, then funding information may be automatically updated by the lender system at block 1120, including making any amendments to the original loan terms provided to the user. The purchase may then be automatically funded by the lender system at block 1122, and the loan may be finalized at block 1124.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for funding an online purchase, the system comprising:
at least one subsystem configured to receive, at a lending institution, an application for a monetary loan from a user online, the user being a member of the lending institution;
at least one subsystem configured to approve the monetary loan online and to generate an approval code associated with the monetary loan when the monetary loan is approved;
at least one subsystem configured to provide, based on the user being a member of the lending institution provide, the user with a plurality of products and dealers for the products online from which the user may choose;
at least one subsystem configured to receive purchasing documents from a dealer selected by the user for a product selected by the user;
at least one subsystem configured to receive the approval code from the dealer and, based on receiving the approval code, to grant the dealer access to a dealer portal, wherein the dealer portal is configured to display customer information about the monetary loan associated with approval code and to receive information entered by the dealer via the dealer portal about the product selected by the user;
at least one subsystem configured to automatically process information contained on the purchasing documents and the information entered by the dealer; and
at least one subsystem configured to, in response to the approval code being received from the dealer when the processing is complete, send to the dealer a monetary amount equal to a purchase price of the product selected by the user.

2. The system of claim 1, wherein the monetary loan is fulfilled online using an electronic signature of the user.

3. The system of claim 1, wherein the monetary loan is fulfilled online by automatically evaluating a credit history of the user.

4. The system of claim 1, wherein the information contained on the purchasing documents is processed according to one or more business rules.

5. The system of claim 1, further comprising at least one subsystem configured to update one or more terms of the monetary loan based on a final purchase price of the product selected by the user.

6. The system of claim 1, wherein the product selected by the user is an automobile.

7. A method of funding an online purchase, the method comprising:
receiving, at a computer associated with a lending institution, an application for a monetary loan from a user online, the user being a member of the lending institution;
approving, using the computer, the monetary loan online, wherein approving results in generating an approval code associated with the monetary loan when the monetary loan is approved;
based on the user being a member of the lending institution:
providing, using the computer, the user with a plurality of products and dealers for the products online from which the user may choose;
receiving, using the computer, purchasing documents from a dealer selected by the user for a product selected by the user;
receiving, using the computer, the approval code from the dealer;
in response to receiving the approval code from the dealer, granting the dealer access to a dealer portal, wherein the dealer portal displays customer information about the monetary loan associated with the approval code and wherein the dealer portal receives information entered by the dealer about the product selected by the user;

automatically processing, using the computer, information contained on the purchasing documents and the information entered by the dealer; and in response to receiving the approval code from the dealer and when the processing is complete, sending, using the computer, to the dealer a monetary amount equal to a purchase price of the product selected by the user.

8. The method of claim 7, wherein the monetary loan is fulfilled online using an electronic signature of the user.

9. The method of claim 7, wherein the monetary loan is fulfilled online by automatically evaluating a credit history of the user.

10. The method of claim 7, wherein the information contained on the purchasing documents is processed according to one or more business rules.

11. The method of claim 7, further comprising updating one or more terms of the monetary loan based on a final purchase price of the product selected by the user.

12. The method claim 7, wherein the product selected by the user is an automobile.

13. A computer-readable medium encoded with computer-readable instructions for funding an online purchase, the computer-readable instructions comprising instructions for causing a computer to:

receive, at a lending institution, an application for a monetary loan from a user online, the user being a member of the lending institution;

approve the monetary loan online and to generate an approval code associated with the monetary loan when the monetary loan is approved;

based on the user being a member of the lending institution:

provide the user with a plurality of products and dealers for the products online from which the user may choose;

receive purchasing documents from a dealer selected by the user for a product selected by the user;

receive the approval code from the dealer;

grant the dealer access, based on the received approval code, to a dealer portal, wherein the dealer portal displays customer information about the monetary loan associated with the approval code and wherein the dealer portal received information entered by the dealer about the product selected by the user;

automatically process information contained on the purchasing documents and the information entered by the dealer; and in response to receiving the approval code from the dealer and when the processing is complete, send to the dealer a monetary amount equal to a purchase price of the product selected by the user.

14. The computer-readable medium of claim 13, wherein the monetary loan is fulfilled online using an electronic signature of the user.

15. The computer-readable medium of claim 13, wherein the monetary loan is fulfilled online by automatically evaluating a credit history of the user.

16. The computer-readable medium of claim 13, wherein the information contained on the purchasing documents is processed according to one or more business rules.

17. The computer-readable medium of claim 13, further comprising instructions for causing a computer to update one or more terms of the monetary loan based on a final purchase price of the product selected by the user.

18. The computer-readable medium of claim 13, wherein the product selected by the user is an automobile.

* * * * *

UNITED STATES PATENT AND TRADEMARK OFFICE
CERTIFICATE OF CORRECTION

| | | |
|---|---|---|
| PATENT NO. | : 8,204,788 B1 | Page 1 of 1 |
| APPLICATION NO. | : 11/935400 | |
| DATED | : June 19, 2012 | |
| INVENTOR(S) | : Ivankovich et al. | |

It is certified that error appears in the above-identified patent and that said Letters Patent is hereby corrected as shown below:

In column 15, line 23, in claim 12, after "claim", insert --of--, therefor

Signed and Sealed this
Second Day of October, 2012

David J. Kappos
*Director of the United States Patent and Trademark Office*